United States Patent [19]

Muramatsu

[11] Patent Number: 4,786,074
[45] Date of Patent: Nov. 22, 1988

[54] REAR SUSPENSION OF AUTOMOBILE

[75] Inventor: Tadao Muramatsu, Toyota, Japan

[73] Assignee: Toyota Jidosha Kabushiki Kaisha, Toyota, Japan

[21] Appl. No.: 14,594

[22] Filed: Feb. 13, 1987

[30] Foreign Application Priority Data

Feb. 17, 1986 [JP] Japan ................................ 61-30629

[51] Int. Cl.⁴ .................................................. B60G 3/28
[52] U.S. Cl. ...................................... 280/690; 280/701
[58] Field of Search ............... 280/701, 697, 698, 690, 280/666, 670

[56] References Cited

U.S. PATENT DOCUMENTS

| 4,046,403 | 9/1977 | Yoshida | 280/701 |
| 4,690,426 | 9/1987 | Kubo et al. | 280/701 |
| 4,740,011 | 4/1988 | Mitobe et al. | 280/701 |

FOREIGN PATENT DOCUMENTS

| 136563 | 4/1985 | European Pat. Off. | 280/701 |
| 54-38762 | 11/1979 | Japan. | |
| 57-192805 | 6/1982 | Japan. | |
| 191617 | 11/1983 | Japan | 280/701 |

Primary Examiner—John J. Love
Assistant Examiner—Karin L. Ferriter
Attorney, Agent, or Firm—Oblon, Fisher, Spivak, McClelland & Maier

[57] ABSTRACT

A rear suspension includes a suspension arm for supporting an axle carrier. The suspension arm has a first arm portion disposed laterally of a car body and having an inner end pivotably connected to the car body through a first bushing and an outer end pivotably connected to the axle carrier and a second arm portion disposed longitudinally of the car body and having a front end pivotably connected to the car body through a second bushing and a rear end connected to the first arm portion. The second arm portion is formed to be undeformable vertically, deformable laterally of the car body and deformable by a torsional force.

6 Claims, 3 Drawing Sheets

F I G. I

REAR SUSPENSION OF AUTOMOBILE

BACKGROUND OF THE INVENTION

1. Field of the Invention

This invention relates to a rear suspension of an automobile and, more particularly, to a rear suspension comprising a suspension arm connected pivotably to a car body by two supports spaced from each other longitudinally of the car body and supporting pivotably an axle carrier by two supports spaced from both said supports laterally of the car body.

2. Description of the Prior Art

A suspension has been proposed which comprises a suspension arm having a generally L-shape as viewed in plan, pivotably connected to a car body through bushings disposed in inward front and rear supports and supporting pivotably an axle carrier at outward front and rear supports (Japanese published examined Patent application-2nd Publication (Tokkyo Kôô) No. 38762/79). According to the suspension, respective support points are located to meet such requirements that a straight line interconnecting the rear support point at the car body side and the rear support point at the axle carrier side is orthogonal to a center line of a grounding face of a wheel and a straight line interconnecting the front and rear support points at the car body side makes a predetermined cross angle with respect to a center line of the car body.

With the suspension noted above, arm portions of the suspension arm extending laterally and longitudinally are formed to be rigid. Thus, when a wheel supported by the suspension arm is forced laterally or longitudinally, the degree of displacement of the wheel is affected in either case by the hardness of bushings disposed in the front and rear supports of the suspension arm at the car body side. Therefore, proper lateral rigidity is difficult to ensure while maintaining proper longitudinal compliance. As a result, it is not easy to ensure the strength of the suspension and car body member on one hand while improving riding comfort and controllability on the other hand.

Next, with said suspension, the straight line interconnecting the front and rear support points of the suspension arm at the car body side, i.e., a swing axis of the suspension arm is not parallel to the axes of the bushings disposed in the respective supports, but intersects the same at a certain angle. Accordingly, when the suspension arm is swung, a pinching force acts on each of the bushings to cause degradations of durability and vertical rigidity of the bushing.

According to an independent rear suspension disclosed in the Utility Model Public Disclosure (KOKAI) No. 192805/82, one of the bifurcated arm portions provided on a trailing arm is formed so as to be undeformable or rigid vertically and deformable laterally. Thus, while the controllability may be improved, the same problems as the suspension noted above are encountered in such points that the lateral and longitudinal displacements of the wheel are affected by the hardness of bushings disposed respectively in the bifurcated arm portions and the hardness of a bushing disposed in the car body side of a rod which is connected at one end thereof to the trailing arm and at the other end to the car body for restricting a lateral motion of the trailing arm.

According to a rear suspension disclosed in the Patent Public Disclosure (KOKAI) No. 53215/84, an arm portion disposed longitudinally is formed so as to be deformable vertically and undeformable laterally. Then, it is difficult to ensure the proper lateral rigidity and the vertical rigidity may be degraded.

SUMMARY OF THE INVENTION

An object of the present invention is to provide a rear suspension which can ensure proper longitudinal compliance, lateral rigidity and compliance steer due to lateral force.

Another object of the present invention is to provide a rear suspension which can displace bushings disposed respectively in front and rear supports of a suspension arm at the car body side substantially in one direction, thereby expanding the degree of freedom for selecting the bushings.

Still another object of the present invention is to provide a rear suspension capable of reducing a pinching force acting on the bushings.

According to the present invention, a rear suspension provided with a suspension arm for supporting an axle carrier is characterized in that said suspension arm has a first arm portion disposed laterally of a car body, the first arm portion being connected on one end thereof to a car body through a first bushing and on the other end to said axle carrier respectively pivotably and a second arm portion disposed longitudinally of the car body and connected on a front end thereof pivotably to the car body through a second bushing and on a rear end to said first arm portion, the second arm portion being formed to be undeformable or rigid vertically and deformable laterally of the car body. The second arm portion is preferably deformable by a torsional force.

In a preferred embodiment of the present invention, said first bushing provides a hard spring constant in the lateral direction of the car body and said second bushing provides a soft spring constant in the longitudinal direction of the car body.

In another embodiment of the present invention, said first bushing has a spherical joint provided inside thereof.

The suspension arm is connected to a lower portion of the axle carrier, and an upper portion of the axle carrier is connected to an arm having a well-known shape per se, i.e. a so-called I-arm, bifurcated arm and other arm, i.e. a so-called A-arm or a shock absorber.

When a small longitudinal force acts on a rear wheel supported by the axle carrier, the first and second bushings are flexed together and the rear wheel is translated in parallel.

When a larger longitudinal force acts on the rear wheel, the first and second bushings are first flexed to translate the rear wheel in parallel and then the second arm portion is flexed. However, the second bushing is not displaced substantially in the lateral direction at this time. Therefore, the rear wheel moves rearward or forward.

When the rear wheel receives a lateral force, the second arm portion is flexed and the rear wheel is subjected to steering change.

When the rear wheel bounds and rebounds, the second arm portion is twisted to reduce a pinch to the bushing.

Since the second arm portion is formed to be undeformable or rigid vertically and deformable laterally of the car body and acts as above mentioned, the longitudinal displacement of the rear wheel is affected mainly by a spring constant of the second bushing and the lateral displacement of the rear wheel is affected mainly by a spring constant of the first bushing. In other words, the characteristics of the first and second bushings can be independently selected irrespective of mutual spring characteristics so that proper longitudinal compliance and lateral rigidity tend to be ensured. Also, proper compliance steering due to the lateral force is obtained by selecting the proper rigidity of the second arm portion.

Since the second arm portion is twisted at the time of bound and rebounding, and pinch of the bushing engaging this arm portion is reduced to improve the durability and vertical rigidity.

BRIEF DESCRIPTION OF THE DRAWINGS

Other objects and features of the invention will become apparent from the following description of preferred embodiments of the invention with reference to the accompanying drawings, in which.

DESCRIPTION OF THE PREFERRED EMBODIMENTS

Figure 1:
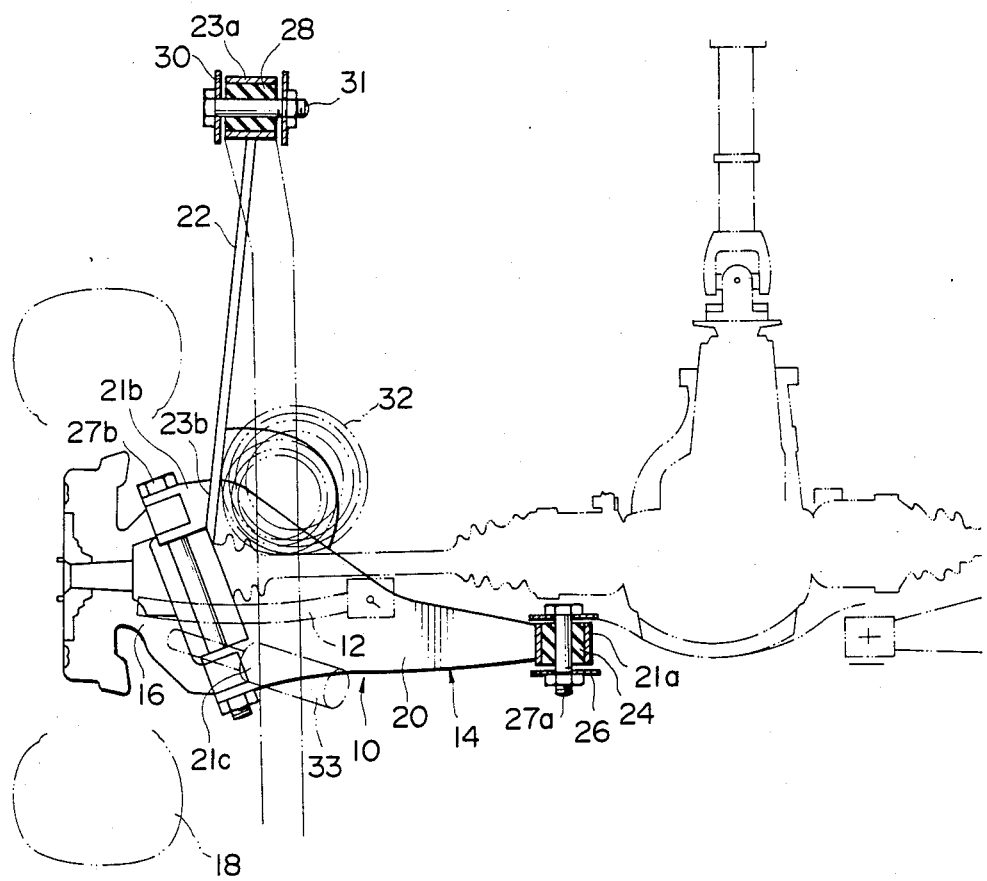
FIG. 1 is a plan view showing a suspension arm provided on a rear wheel suspension.

A suspension 10 shown in FIG. 1 supports an axle carrier 16 with suspension arms 12,14 disposed at upper and lower portions. A rear wheel 18 is supported by the axle carrier 16. The suspension arm 12 is a so-called I-arm.

The lower suspension arm 14 includes a first arm portion 20 and a second arm portion 22.

The first arm portion 20 is formed by pressing a plate material and has sufficiently large longitudinal and lateral rigidities, i.e., the arm portion 20 is undeformable longitudinally and laterally. The first arm portion 20 is disposed laterally of a car body. It is connected on an inner end 21a thereof to a bracket 26 of the car body through a bushing 24 by bolts and nuts 27a pivotably about a horizontal axis and on two outer ends 21b,21c to the axle carrier 16 by bolts and nuts 27b pivotably about a horizontal axis. The inner end 21a of the first arm portion 20 is located behind a rotary center axis of the rear wheel 18.

Figure 2:
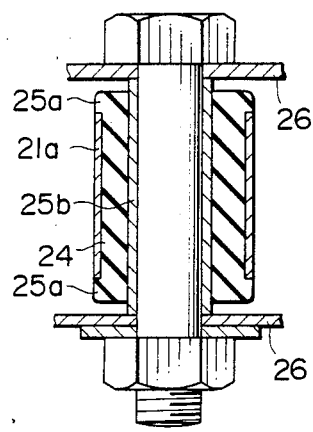
FIG. 2 is a sectional view showing a bushing provided on an inner end of a first arm portion.

The bushing 24 formed of rubber has a radially hard spring constant. The bushing 24 is formed such that both ends 25a thereof project axially from the inner end 21a of the first arm portion 20 and an outer diameter of each end 25a equals that of the end 21a, when the bushing 24, as shown in FIG. 2, is forced into the end 21a.

On the other hand, a collar 25b adhered to an inner peripheral surface of the bushing 24 is formed to have a length longer than the axial length of the bushing 24. Thus, when the bushing 24 is disposed to press the collar 25b against the bracket 26 of the car body, a gap is produced between the end 25a of the bushing 24 and the bracket 26. Thus, the bushing 24 can be deformed axially within the extent of the gap to present a soft spring constant within this extent. An abruptly rising spring constant is presented after the end 25a abuts against the bracket 26 since the end 25a is compressed.

The second arm portion 22 obtained by pressing a plate material or a plate material itself is formed to have a rectangular, L-shaped or groove-shaped section. The second arm portion 22 is disposed longitudinally of the car body to be undeformable or rigid vertically and deformable laterally. Further, the second arm portion 22 is deformable by a torsional force. Here, the words "undeformable" and "deformable" mean relative concepts. More specifically, the condition of the arm portion not deformed to cause the steer change of the rear wheel by the longitudinal or lateral force applied to the rear wheel in the normal travelling of an automobile or at the time of bound and rebound is called "undeformable". On the other hand, the condition of the arm portion deformed to cause the steering change of the rear wheel is called "deformable". Further, the meaning of "longitudinal" includes inclination.

The second arm portion 22 is on a front end 23a connected pivotably to a bracket 30 of the car body through a rubber bushing 28 by bolts and nuts 31 and on a rear end 23b welded to the first arm portion 20. The bushing 28 has a longitudinally soft spring constant.

A coil spring 32 is disposed between the suspension arm 14 and the car body. A shock absorber 33 is disposed between the axle carrier 16 and the car body.

Figure 3:
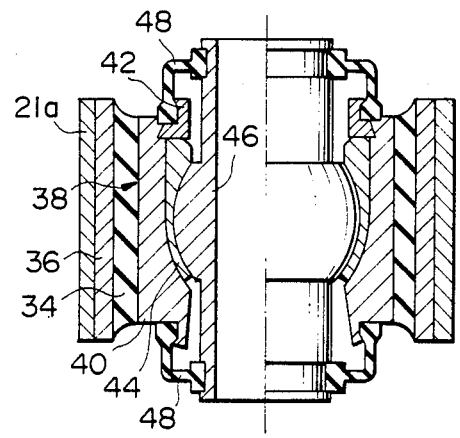
FIG. 3 is a sectional view showing another embodiment of the bushing provided on the inner end of the first arm portion.

FIG. 3 shows another embodiment of the bushing attached to the inner end 21a of the first arm portion 20. The bushing 34 is adhered on an outer peripheral surface to an outer tube 36 and has on an inner peripheral surface a spherical joint 38. The outer tube 36 is forced into the inner end 21a of the arm portion 20.

The spherical joint 38 includes a holder 40 adhered to the bushing 34, a seat 44 held on the holder 40 by a retainer 42 and having an inner peripheral surface formed spherically and an inner tube 46 having an outer peripheral surface formed spherically and conforming to the spherical surface of said seat 44, and rubber seals 48 are stretched between the holder 40 and the inner tube 46.

While a bushing gets hard in a radial direction as a general property of a cylindrical bushing, the bushing gets considerably soft in an axial direction since the deflection of rubber acts as shear. In the embodiment shown in FIG. 3, the bushing 34 can be axially displaced until a certain degree of axial input is reached, and the toe change is restrained against a longitudinal input to improve the rectilinear travelling property. Also, the pinch applied to the bushing 34 is damped by the spherical joint 38.

Further in said embodiment, the axle carrier 16 is supported by the suspension arms 12,14 disposed at the upper and lower portions. Instead, the lower portion of the axle carrier 16 may be connected to the suspension arm 14, while the upper portion may be connected to a shock absorber to constitute a Macpherson strut type suspension.

Operation of the Embodiment

Figure 4:
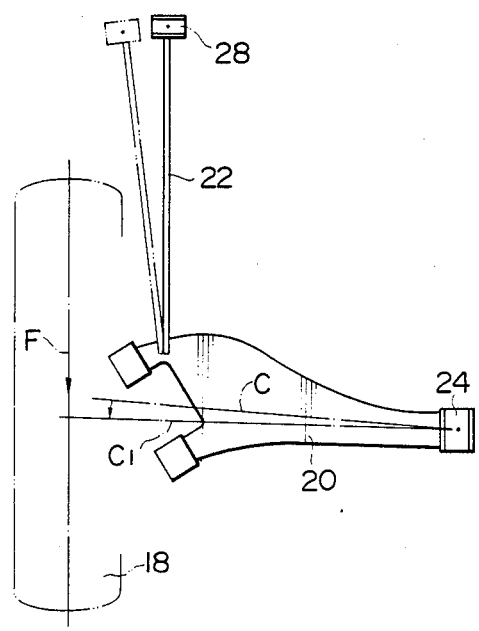
FIGS. 4 to 6 are explanatory illustrations showing the operation of the suspension arm.

When a longitudinal force is applied to the rear wheel:

As shown in FIG. 4, when backward force F acts on the rear wheel 18, the rear wheel 18 first flexes the first and second bushings 24,28 to move substantially in parallel.

When the backward force F is increased, the first arm portion 20 is displaced so as to move the axis C to a position $C_1$, while the second arm portion 22 tends to displace toward the phantom line. However, since the second arm portion 22 is deformable laterally, the second arm portion 22 is deformed to produce only longitudinal deflection of the second bushing 28 so that a large longitudinal displacement of the rear wheel 18 is permissible. Thus, the input from road surfaces and the strain of the suspension arm can be reduced. Further, the selection of characteristics of the second bushing 28 can be facilitated.

Figure 5:
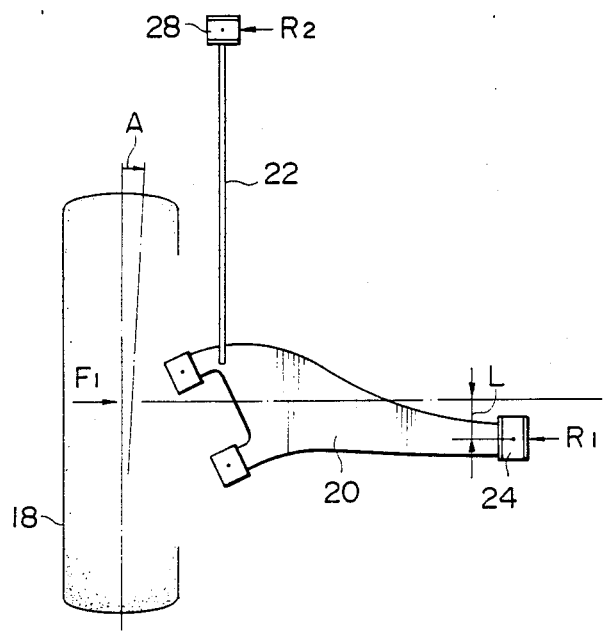

When a lateral force is applied to the rear wheel:

As shown in FIG. 5, when the lateral force $F_1$ acts on the rear wheel 18, this lateral force is balanced with reactions $R_1, R_2$ of the bushings 24, 28. In this case, the reaction $R_2$ is sufficiently small as compared with the reaction $R_1$. Also, as above mentioned, the first arm portion 20 has the inner end 21a located behind the rotary center line of the rear wheel 18.

Since the lateral rigidity of the second arm portion 22 is low, the second arm portion 22 is bent laterally by offset moment $L \times R_1$ and is liable to produce the steering change as shown by the arrow A. The steering change amount in this case can be controlled to a proper value by the distance L and is the lateral rigidity of the second arm portion 22.

Figure 6:
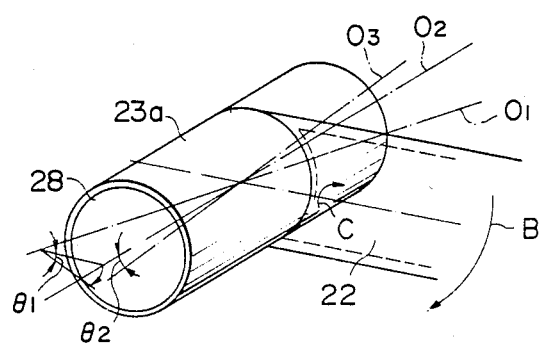

When the rear wheel bounds and rebounds:

As shown in FIG. 6, an axis about which the end 21a of the first arm portion 20 and the end 23a of the second arm portion 22 are swung relative to the car body is set as $O_1$ and an axis of the end 23a of the second arm portion 22 is set as $O_2$. When the rear wheel rebounds and the second arm portion 22 is twisted in the direction of arrow B, the axis of the end 23a at the time of the rebound becomes $O_3$. In the rebound of the rear wheel, the second arm portion 22 is swung by an angle $\theta_1$. When the second arm portion 22 is rigid, a pinch angle $\theta_2$ is applied to the bushing 28 by the swing of the second arm portion. However, since the second arm portion 22 is twisted in the direction C, the pinch angle applied to the bushing 28 is actually reduced to $\theta_2$ minus the pinch angle.

Obviously, numerous modifications and variations of the present invention are possible in light of the above teachings. It is therefore to be understood that within the scope of the appended claims, the invention may be practiced otherwise than as specifically described herein.

What is claimed is:

1. A rear suspension of an automobile provided with a suspension arm for supporting an axle carrier characterized in that said suspension arm has a first arm portion disposed laterally of a car body and having an inner end pivotably connected to the car body through a first bushing and an outer end pivotable connected to said axle carrier, the inner end being located behind a rotary axis of a rear wheel supported by the axle carrier and a second arm portion disposed longitudinally of the car body and having a front end pivotably connected to the car body through a second bushing and a rear end connected to said first arm portion, the second arm portion being undeformable vertically and deformable laterally of the car body.

2. A rear suspension as claimed in claim 1, wherein said second arm portion is formed to be deformable by a torsional force.

3. A rear suspension as claimed in claim 1, wherein said first bushing has a hard spring constant laterally of the car body and said second bushing has a soft spring constant longitudinally of the car body.

4. A rear suspension as claimed in claim 1, wherein said first bushing has a spherical joint provided inside thereof.

5. A rear suspension as claimed in claim 1, wherein said first arm portion is formed to be undeformable vertically and laterally.

6. A rear suspension of an automobile provided with a suspension arm for supporting an axle carrier supporting a rear wheel characterized in that said suspension arm has a first arm portion disposed laterally of a car body and having an inner end pivotably connected to the car body through a first bushing having a hard spring constant laterally of the car body and an outer end pivotably connected to said axle carrier, said inner end being located behind a rotary axis of said rear wheel, said first arm portion being formed to be undeformable vertically and laterally and a second arm portion disposed longitudinally of the car body and having a front end pivotably connected to the car body through a second bushing having a soft spring constant longitudinally of the car body and a rear end connected to said first arm portion, said second arm portion being formed to be undeformable vertically, deformable laterally of the car body and deformable by a torsional force.

* * * * *